United States Patent [19]

Hafner

[11] Patent Number: 4,550,989
[45] Date of Patent: Nov. 5, 1985

[54] RIMLESS SPECTACLES

[76] Inventor: Klaus Hafner, Knappenweg 7, Stuttgart, Fed. Rep. of Germany

[21] Appl. No.: 446,672

[22] Filed: Dec. 3, 1982

[30] Foreign Application Priority Data

Dec. 5, 1981 [DE] Fed. Rep. of Germany ....... 3148166
Oct. 27, 1982 [DE] Fed. Rep. of Germany ....... 3239700

[51] Int. Cl.⁴ .......................... G02C 1/08; G02C 1/04; G02C 5/00
[52] U.S. Cl. .................... 351/103; 351/106; 351/154
[58] Field of Search ........................ 351/103, 106, 154

[56] References Cited

U.S. PATENT DOCUMENTS 1,358,200 11/1920 Hansen .
2,367,418 1/1945 Morrill .................... 351/110

FOREIGN PATENT DOCUMENTS 1047476 12/1958 Fed. Rep. of Germany .
1227691 10/1966 Fed. Rep. of Germany .
133930 10/1919 United Kingdom .
755746 8/1956 United Kingdom ................ 351/106

Primary Examiner—Rodney B. Bovernick
Attorney, Agent, or Firm—McGlew and Tuttle

[57] ABSTRACT

Rimless spectacles have the lenses which are not held by screws. The nose-bridge and the end-pieces of the temples consist of hook-like clamps that hold and touch the lenses for a short length from the front and/or the back side. These clamps together with a tight-thread or band going all the way around the lenses hold the lenses to the nose-bridge and end-pieces.

4 Claims, 5 Drawing Figures

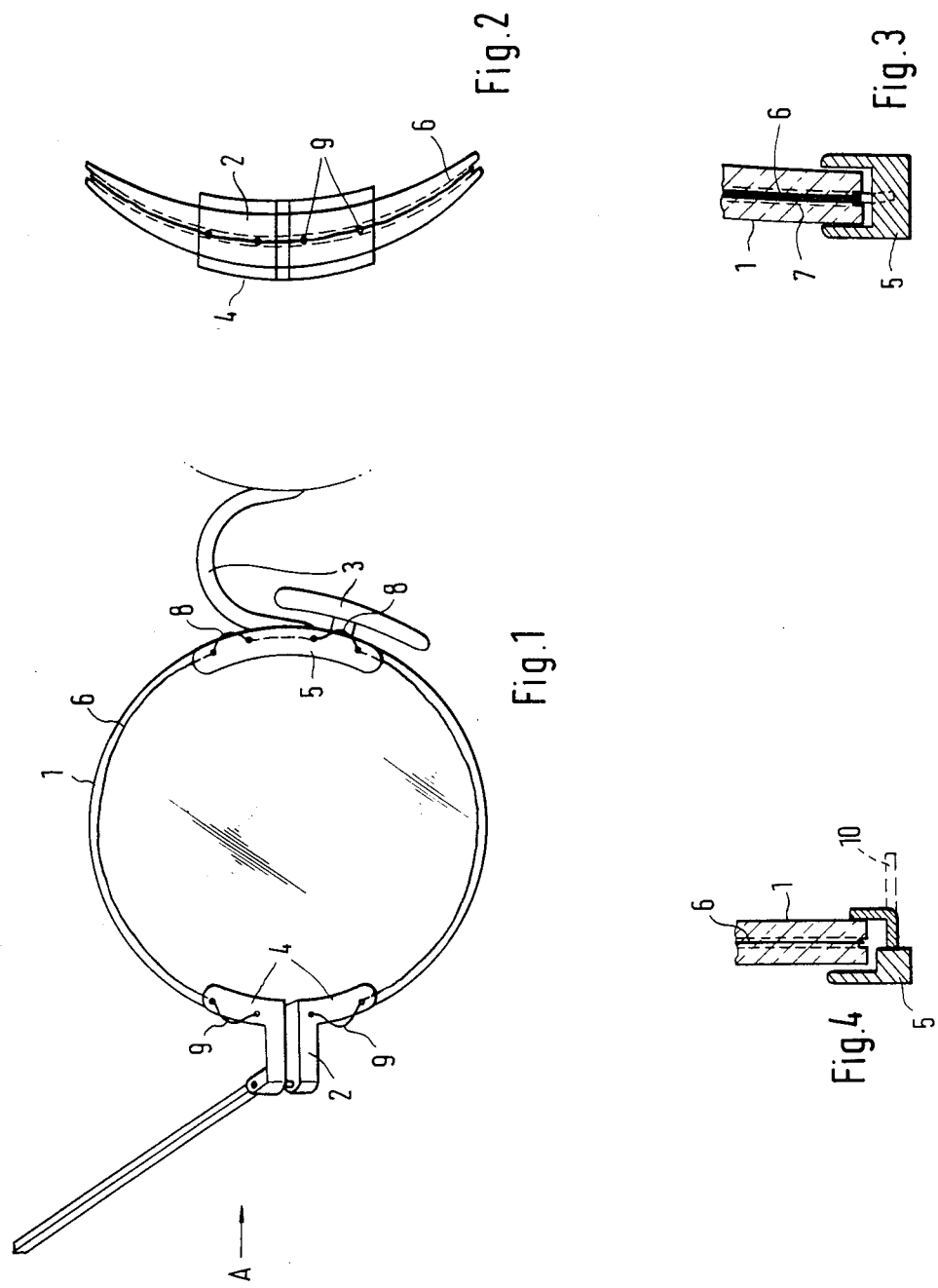

RIMLESS SPECTACLES

FIELD AND BACKGROUND OF THE INVENTION

The invention concerns rimless spectacles where the endpieces and the bridge can be fixed to the lenses without closing-blocks or an upper-bar or drilling holes through the lenses as it has to be done with all rimless spectacles. These holes can be drilled easily when using simple plastic lenses. However, it is extremely difficult to drill hard phototropic lenses or very risky when the lenses are expensive as for example bifocal lenses. The risk that the lenses crack is very high for the optician. Therefore, complicated or expensive lenses are not used very often because of these disadvantages.

The present invention is a solution to avoid drilling holes in the lenses. It is known that there are spectacles where one half has not the traditional eye rim but a tight-thread or band and the ends are fixed in a suitable way near the end-pieces and the nose-bridge.

In German AS Nos. 11 08 942 and, 10 47 476 frames made in that way are disclosed. With all these frames we find two different parts of construction which is the rigid upper bar and the elastic thread or band for the lower part or vice versa. These styles do not give the best aesthetic impression and they have not the standard of perfection as with the rimless spectacles where however hioles have to be drilled into the lenses at the level of the end-pieces and the bridge in order to stabilize frame and lenses. The present invention does not require drilling or the use of screws.

German AS No. 12 27 691 discloses a pair of spectacles without a frame where no holes are necessary in the glasses, however, a rigid upper bar is provided there too, and the glasses are held by a flexible thread. To connect the glasses and the upper bar, retaining means are required which disfigure the frame so that special ornamental trimmings have to be attached.

Moreover, rimless eye-glasses are known from German Pat. No. 923 812 which have no upper bar for the lenses. For stabilization of these lenses a kind of clamp is used. The bridge is fixed by means of a plastic thread to the lenses but in addition there are holes through the clamps and the lenses. The drilling that is required in this execution has many disadvantages as already mentioned and will be avoided by the new suggested solution.

SUMMARY OF THE INVENTION

The subject of the invention are eye glasses having no frame and no upper-bar. The bridge and the end-pieces having irrespective of each other clamps that clasp the lenses to the front and/or the back-side. These clamps have a thread or band going all around the lenses to hold them.

An important feature of the invention is that the elastic thread or band follows completely all around the circumference of each lens.

According to one embodiment of the invention end-pieces are used for connecting ends of the threads. In another embodiment the end-pieces include clamping plates or bars which hold the threads.

With the first embodiment the ends of the thread can be soldered or welded direct to the end-piece. You have a frame where the thread goes directly to the end-piece and the bridge.

In the second embodiment of end-pieces each consist of two parts. First the lens with the metal bars on it and the pins. Thus you mount the finished lens on to the corresponding holder-bar of the end-piece of the temples and the bridge that have both holes for the threaded pins that are connected with nuts. The finished lens can be big or small. It is only a matter of length of the thread. The metal bars holding the thread can be moved up and down as per necessity allowing therefore a perfect individual fitting.

The invention offers various advantages. First, the glasses may be easily fixed on as per the individual features of the face, by moving the bridge or the end-pieces up or down by the loops, that need only a little tightening up to straighten the wire for having again the correct fit on the lenses.

By the possibility of moving the bridge and/or the end-pieces the glasses can be fitted on easily irrespective of the shape of the lenses. Furthermore, there can be used lenses already edged as the shape of these is no more essential as there is no rigid frame where they have to be fitted in.

The new glasses have a particular advantage when using bifocal-lenses as these can be adjusted afterwards on the finished glasses by moving them up and down. This allows the optician by a little readjustment to meet the requirements of his customer.

Moreover, there is no need to drill holes through the lenses as this is very difficult to do with hard photomatic lenses as all glass-lenses crack easily. It is advantageous when wearing the glasses that there are no disturbing holes in the lenses and in addition the customer can choose the shape of lenses he wishes.

A big advantage lies in the fact that both a children's size and an extra large size can be made with the same parts; it is only necessary to change the length of the thread or band. This is possible because each end of the thread is passed through two holes in the metal bar on the temple side to form a loop, so that the thread can be tensioned simply by tightening its two ends. Thus, the ends of the thread need not be soldered or welded together. Unlike with conventional spectacle frames, therefore, the optician need not keep a range of sizes in stock; he can make any desired shape and size from one set simply by varying the length of the thread. The term "thread" will be used for convenience but it includes bands or wires.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial front perspective view of a first embodiment of the invention;

FIG. 2 is a partial side view taken generally in the direction of arrow A in FIG. 1;

FIG. 3 is a fragmentary sectional view of an end-piece clamp for a standard lens in accordance with the invention;

FIG. 4 is a view similar to FIG. 3 for corrective lenses; and

DESCRIPTION OF THE PREFERRED EMBODIMENTS

Figure 5:
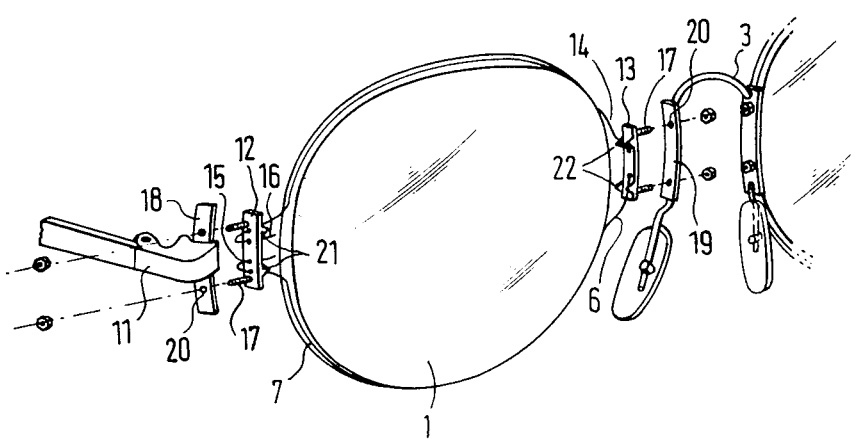
FIG. 5 is a partial perspective and exploded view of a second embodiment of the invention.

FIG. 1 shows a first embodiment of the inventive rimless eye glass construction. In this example it is shown for easy understanding the right part of the glasses only. To the lens 1 is fixed the end-piece 2 and a bridge 3. Both have clamps that touch the lenses at a short distance.

The thread 6 goes all arond the groove 7 of the lens 1. For tightening of the thread 6 and of the clamps 4 and 5 which are provided on the bridge and end-pieces, the thread is drawn loop-like through the clamps as indicated by 8 and 9. The ends of the thread 6 are fastened to the end-pieces 2 in a suitable way. The end-pieces with the thread can be tightened for example by screwing, in a way that the clamps 4 and 5 are tight on the lens 1 that is gives stability to the complete set.

If the end-piece consists of one single part the ends of the thread can be soldered or welded together. The way of fastening the thread depends highly on the material used. Instead of a thread there may be used a tightening-band.

FIG. 2 shows the loop-like execution 9 of the thread 6 of the end-piece clamp.

FIG. 3 shows a cross-section of the clamps 4 and 5 and how they are fixed on the lens 1.

FIG. 4 shows how the hook-like clamps can be adjusted to the thickness of corrective lenses. One or more hooks or cramps at one side can be bent in a way to guarantee stability of the glasses when the clamps and the lens are tightened. The other side of the end-pieces or bridge include projections which extend over a face of the lens.

The clamps 4 and 5 are loose on the lenses 1. Therefore, they can be moved up and down easily which allows a most simple adjustment of the glasses to the face. By the possibility of moving parts of the glasses there may be re-used already edged complicated or expensive lenses, as these can be fitted in easily and adjusted correspondingly.

The adjustment of the finished glasses can give great comfort to those wearing bifocal-lenses as here up to now no changes can be made afterwards but often a later adjusting is required.

In the example as per FIG. 5 is shown for easy understanding the right part of the glasses only. On to the lens are mounted and screwed the end-piece of the temple 11 and the bridge 3. These parts have short metal bars 12 and 13 that fit together with the corresponding metal part that holds the thread around the lens.

The thread 6 in the groove 7 is going all around the lens 1. In order to tighten the thread 6 and the metal bars 12 and 13 on to the lens, the thread, wire or band is fastened with loops. There are two or more loops 14 and 15 on each side of the lens as these parts with the loops are mounted of fitted together with end-pieces and bridge 3. The metal bar 12 has several loops. The ends of the thread are strongly tightened but on the drawing these ends are made prominent at 16. On the ready glasses, the thread lies tight between lens and metal piece.

The metal bars 12 and 13 holding the thread have threaded pins 17 and are clamped to bars 18 and 19, which have holes for the pins, by nuts threaded on the pins. The end-piece bar 12 and the bridge bar 3 have corresponding holes that fit together with the pins soldered on the metal bars holding tight the lens by means of a thread. The metal bars 12 and 13 may have cramps or projections 21 and 22.

The metal bars on the lens can easily be moved and adjusted according to the necessity of the face. Thus any lenses can be adjusted also afterwards that is most important with bifocal-lenses and with no frame up-to-now possible.

I claim:

1. Rimless spectacles comprising:
 a pair of lenses each having a rim and opposite faces;
 a bridge piece connected between said lenses, said bridge piece having at least one fixed projection on either side thereof, each fixed projection extending over a portion of one face of each lens adjacent the rim of each lens, said bridge piece having at least one bendable clamping projection spaced from at least one fixed projection and bent into clamping engagement with another face of each lens adjacent the rim of each lens so that said bridge piece is clamped to each lens;
 an end-piece connection to each lens on a side of each lens substantially opposite said bridge piece, each end piece having at least one fixed projection for engagement over one face of one of said lenses and at least one bendable clamping projection engaged with an opposite face of each lens and bent into clamping engagement with each lens for clampingly connecting each end-piece to each lens respectively;
 a thread engaged completely around the rim of each lens and fixed to said bridge piece and one end-piece for holding said lenses to said bridge piece and end-pieces;
 each end-piece including four holes, end portions of each thread extending into said holes of a respective end-piece to form a pair of loops, said bridge piece including at least two holes on each side thereof adjacent each lens respectively for receiving each thread respectively to form at least one loop, said loops being increaseable in size to tighten the connection between said end-pieces, said bridge piece and said lenses, and reducible in size to loosen the connection for permittng repositioning of said bridge piece and end-pieces.

2. Rimless spectacles according to claim 1, wherein each lens includes a groove around each lens rim, said thread of each lens seeded in the groove of each lens.

3. Rimless spectacles according to claim 1, wherein said bridge piece includes a first metal clamping bar adjacent the rim of each lens, each first clamping bar having a pair of spaced apart openings therethrough, a second metal clamping bar adjacent the rim of each lens and connected to and overlying each first metal clamping bar, each second metal clamping bar having a pair of spaced apart pins engaged in respective openings of each first metal clamping bar, a nut engaged on each pin for holding said first and second clamping bars together, said second clamping bar including said at least two holes for receiving a loop of thread, and carrying said fixed end bendable projections so that said nuts can be loosened to enlarge and reduce the size of said loops, and tightened to fix the thread for each lens.

4. Rimless spectacles according to claim 3, wherein each end-piece comprises a first metal clamping bar adjacent a rim of each lens respectively, a second metal clamping bar engaged over said first metal clamping bar, said first metal clamping bar including a pair of openings and said second metal clamping bar including a pair of pins extending through said opening, a nut threaded onto each pin for holding said first and second metal clamping bars together, said second metal clamping bar including said four openings for defining said loops and said loops positioned between said first and second clamping bars so that said loops can be enlarged and decreased by loosening said nuts, and clamped by tightening said nuts.

* * * * *